United States Patent [19]

Sato

[11] 4,159,169
[45] Jun. 26, 1979

[54] AUTOMATIC FOCUSING APPARATUS

[75] Inventor: Hideharu Sato, Higashikurume, Japan

[73] Assignee: Nihon Beru-Haueru Kabushiki Kaisha (Bell & Howell Japan, Ltd.), Tokyo, Japan

[21] Appl. No.: 910,417

[22] Filed: May 30, 1978

[30] Foreign Application Priority Data

May 28, 1977 [JP] Japan ............................. 52-68144[U]

[51] Int. Cl.² .......................... G03B 7/08; G03B 13/02
[52] U.S. Cl. .......................................... 354/25; 354/31
[58] Field of Search ................ 354/25, 31; 352/14 D; 355/56; 250/201

[56] References Cited

U.S. PATENT DOCUMENTS

| | | | |
|---|---|---|---|
| 3,614,921 | 10/1971 | Yamanaka et al. | 354/25 |
| 4,002,899 | 1/1977 | Stauffer | 354/25 X |

Primary Examiner—Michael L. Gellner
Attorney, Agent, or Firm—Aaron Passman; Rober M. Fitz-Gerald

[57] ABSTRACT

Disclosed is an improvement in an automatic focusing system for use with an optical instrument having a focusable objective which is adjustable in response to optical and electronic components of the system for determining object distance of a remote subject by comparing images of scanning and reference optical systems. The scanner of the optical system is driven oscillatably across an angle to detect a subject between infinity and the minimum focus condition of the objective lens. The present invention relates to improvements in an automatic focusing system for use with an optical instrument having a focusable objective. More particularly, the improvement relates to optically correcting the images transmitted via the optical system to overcome problems of asymmetry of image position and/or intensity.

4 Claims, 5 Drawing Figures

AUTOMATIC FOCUSING APPARATUS

BACKGROUND OF THE INVENTION

The present invention relates to a device to compensate for the unbalance of incident light intensities transmitted by two rangefinding optical systems provided in an automatic focus adjusting system and the image size differences (or the light intensity differences of the images) formed on photosensitive elements which is caused by manufacturing tolerances of the lenses provided in the optical paths of the two optical systems by adding one more lens element in one of the two optical paths (intensity differences are compensated for by light attenuation).

The compensating technique disclosed herein to remove the magnification differences by focal length differences of lenses by adding one more lens element is well-known, but the application of this technique to a rangefinding autofocus system is a unique recognition of the problem and its solution. Of the many devices for adjusting focus automatically, each has its functional limits. A few specially designed systems work for special purposes, but because of the aforesaid limitations errors can occur in adjusting focus or measuring the subject distance.

Improvements are continuously being made to optical instruments such as cameras having a focusable objective lens. One of the more recent series of improvements is an automatic focusing system for adjusting the focus of the lens to an object distance corresponding to the distance of the camera from remote subjects in the field of view of that lens. Typically, an automatic focusing system may use the principle of spatial image correlation wherein a scene imaged by a first auxiliary optical system is scanned by a sensor and the image therefrom is correlated electronically by another sensor with an image from a fixed auxiliary optical system. Such an automatic focusing system has electronics for evaluating the light bundles from images passed through those optical systems and impinging on sensor arrays. Electronics are used to control power for a motor for driving the focusing cell of an objective lens in accordance with the relationship of the images transmitted by the optical systems. Focus of the objective lens occurs when the images from the optical systems are identical; under such conditions the position of the scanning optical system is related to the position of the objective lens.

Certain of the automatic focusing systems, as described in recently filed (see Ser. No. 874,587, assigned to the same assignee as the present application) and issued United States patents, can be mass produced, are neither unduly complex, bulky, nor expensive, and are reliable for use in optical instruments or cameras for the mass market. Such systems include a scanning means, which moves an optical axis to sweep an image across a light sensitive array, and which is connected with another similar array of a conjugate detector. One of the optical axes is fixed relative to the rangefinder and camera lens and the other is movable so as to scan along the other optical axis. An automatic rangefinder array of the type generally described in U.S. Pat. No. 4,002,899, assigned to Honeywell, Inc. and called the Honeywell Visitronics Module, responds to the two optical systems that transmit light from the subject to a detector having a pair of photosensitive arrays. The module is responsive to the fact that the axes of the optical systems are aligned with one another and directed toward the same subject. Such alignment causes the detector to generate a peak pulse, which pulse can be used to adjust the focus of the camera lens. Rangefinding is accomplished by triangulation and comparison of the image from the fixed axis with the image from the scanning axis. By means of suitable electronic circuitry, the peak signal can be converted to a servo signal for the focusing motor.

SUMMARY OF THE INVENTION

The present invention is designed to compensate for the difficulties resulting from displacement of the images relative to the arrays by correcting for such erroneous conditions. Under such circumstances the arrays can receive identical images but irregular or error signals (due to the difference in timing) will result which cause the lens to be automatically adjusted incorrectly. The error is a result of image displacements which are transmitted by the optical systems. The present invention seeks to correct such errors by optical means inserted in the light paths of the optical systems to balance same relative to light intensity and to align same relative to symmetry of light distribution with respect to the photosensitive arrays. More particularly, the focal lengths of the optical systems are adjusted to compensate for the aforesaid errors.

DETAILED DESCRIPTION OF THE INVENTION

Figure 1:
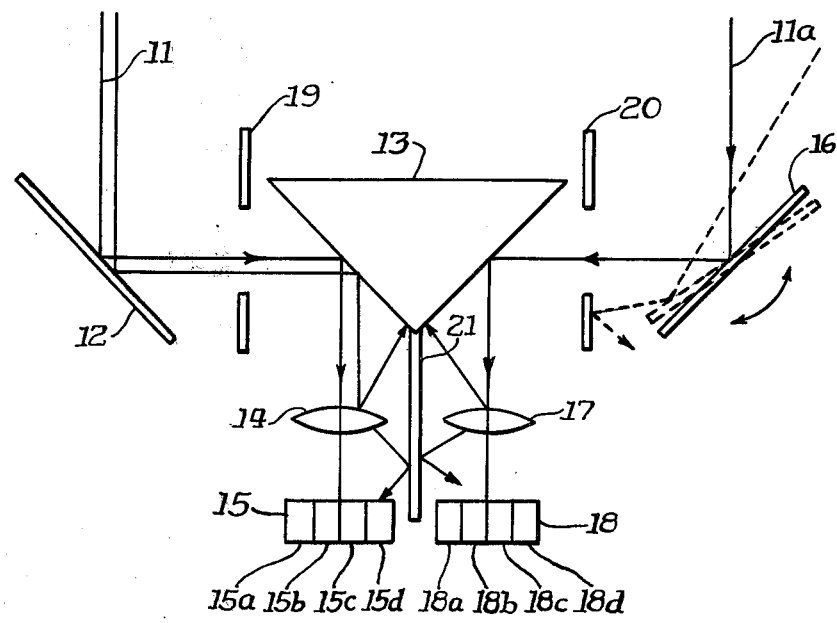
FIG. 1 is a schematic drawing showing a rangefinding optical system.

The present invention relates to an automatic focusing apparatus adapted for use in electrically driven movie cameras and, more particularly, to the improvement of an automatic focusing apparatus comprising two optical systems, one of which scans for rangefinding.

There are known various kinds of automatic focusing apparati for cine cameras, one of which is usually so constructed to have two optical systems 11, 11a to effect a rangefinding of an object to be photographed. The optical system 11 comprises a stationary mirror 12, a prism 13, and a lens 14 to transmit an image transmitted therethrough onto a photosensor 15 comprising a plurality of photoconductive elements 15a to 15d. In the preferred embodiment CdS cells have been found to perform satisfactorily. The image received is distributed upon elements 15a to 15d in accordance with the luminance distribution of the object. Another optical system 11a includes a pivotable mirror 16, a prism 13, and a lens 17, and it forms images upon a photosensor 18. Photosensor 18 includes a plurality of photoconductive elements 18a to 18d. In the preferred embodiment CdS cells perform satisfactorily. The images received are distributed on elements 18a to 18d in correspondence with the object(s). The pivotable mirror 16 is adapted to scan the object(s) in a certain range in a repetitive manner by means of a suitable motor (not shown), thereby providing a scanning optical system. The scanning of the object(s) causes the temporal variation of the image incident on the sensor elements 18a to 18d such that at a given time the image formed by the stationary optical system 11 correlates with one formed by the scanning optical system 11a. During such an occurrence, the photoconductive elements 15a and 18a, 15b and 18b, etc. to 15d and 18d receive equal light intensities respectively, and a focusing signal is generated. The temporal frequency of the focusing signal is compared with the temporal frequency of the scanning cycle denoted by a reference signal generated in synchronism therewith for rangefinding of the object. In the abovementioned automatic focusing apparatus, a photographing lens system is focus adjusted on the basis of the rangefinding, thereby automatically focusing on the object.

In FIG. 1, reference numerals 19, 20 and 21 show field stops or masks 19 and 20 and baffle 21 for controlling incoming light. In the above and following embodiments, the sensors comprise an array of four photoconductive elements, but it will be apparent that more elements could be provided for improvement in rangefinding.

In such an automatic focusing apparatus, it is of importance that the two optical systems 11 and 11a should have identical conjugate optical paths. Otherwise, the systems would be out of balance and errors in rangefinding would result. The unbalance can be either differences in the intensities of light or differences in image sizes. The unbalance in intensity of light is, as shown in FIG. 1, due to the scanning mirror's light deflection and resultant reflection differences, or the volume of image light intensity differences respectively incident on the sensors 15, 18. Equal light intensities could be asymmetrically positioned even though the conjugate images of the object are of the same size.

Figure 3:
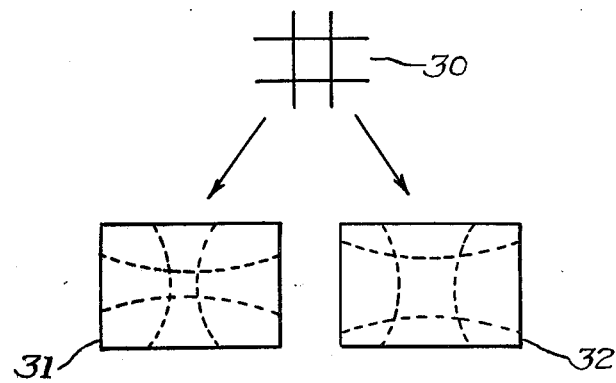
FIGS. 3 and 4 are diagrams each illustrating the occurrence of errors in rangefinding due to the differences in image size.
Figure 4:
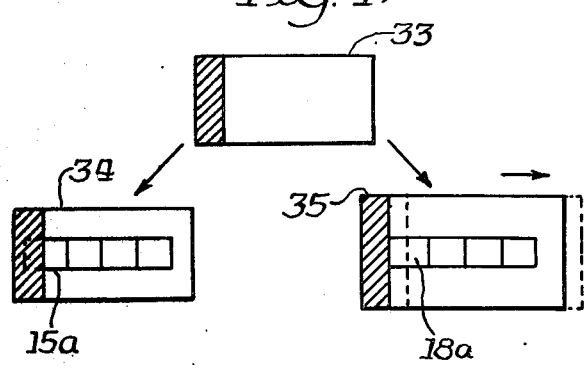

Image differences (see FIG. 3) occur due to differences between the two optical systems and/or differences in focal lengths, e.g., an object 30 is imaged smaller as shown at 31 or is imaged larger as shown at 32. Such conditions occur due to the image size differences and are more marked where an object such as 33 has high contrast, as shown in FIG. 4. More particularly, assuming that image positions at 34 and 35 are incident on the sensors 15 and 18 by the stationary and scanning optical systems 11 and 11a, respectively, then the photosensitive elements 15a and 18a will receive unequal intensities of light unless the image or photosensor 18 is displaced as shown by the dotted line. The resulting errors in rangefinding are overcome by the structure explained in the following description.

Figure 2:
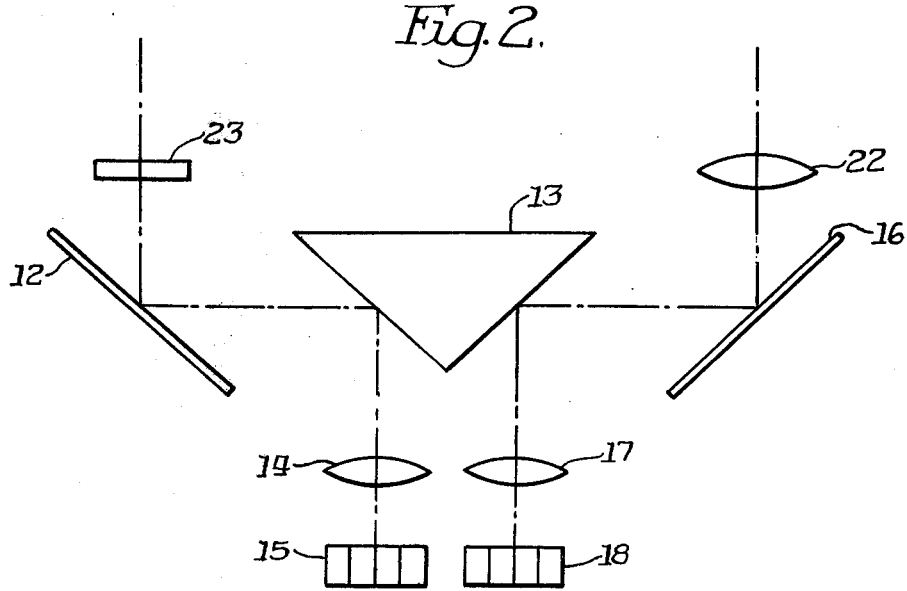
FIG. 2 is a schematic drawing showing an optical system for compensating the errors.

A lens 22 is inserted as shown in FIG. 2 to vary the resultant focal length of the optical system for equalization of image sizes. The lens to be inserted may be used only on one side and, in that case, a plate of glass or filter may be inserted into the other optical system for balancing the light intensity transmitted by both systems.

Experimentation has shown that variations in focal length among the optical systems can compensate for light intensity differences. Thus, the present system provides an improvement in the automatic focusing apparatus of the rangefinding type having the two unequal optical systems 11 and 11a, wherein errors in the rangefinding can be compensated if they are a result of unequal image sizes or unequal light intensities.

Figure 5:
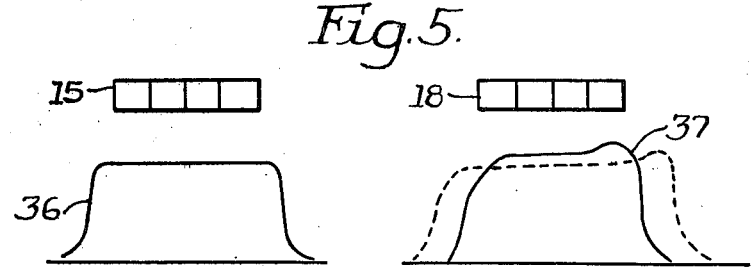
FIG. 5 is a diagram illustrating the principle of compensation of the differences in light intensities.

Refer now to FIG. 5, which is a graph of light intensity distribution 36 formed by the stationary optical system 11 with its intensity indicated along the ordinate and a lateral distance of the sensor along the abscissa. When the image of the scanning optical system 11a is equal in size on the sensor 18, but not equal in light intensity as shown by the curve 37 of FIG. 5, the focal length of the optical system 11a can be adjusted to compensate for this unbalance so that the light impinging on each photoconductive element in the sensor is of equal intensity. In FIG. 5, for example, if the focal length of the optical system 11a is increased to change the light intensity as shown by the dotted curve, then each photoconductive element in the sensor 18 receives an intensity of light substantially equal to that which each photoconductive element in the sensor 15 receives, thereby correcting the unbalance. This method is preferably used to correct light intensity differences which cannot otherwise be eliminated.

While a particular scheme has been shown and described, it is desired that letters patent cover any automatic focusing apparatus wherein the focal length of the optical system for rangefinding is made adjustable to correct the errors caused in rangefinding by the differences in image sizes and light intensities, thereby providing an automatic focusing system with high accuracy.

What is claimed is:

1. An automatic focusing apparatus adapted for use in electrically driven cameras comprising two optical systems, at least one of which scans an object, and a pair of sensors each including a plurality of photoconductive elements and each aligned to be responsive to one of said optical systems, the distance to said object being derived for automatic focusing from a focusing signal generated when said sensors receive equal image luminance distributions and image sizes from the object formed thereon as transmitted by said optical systems wherein the focal length of either of said optical systems is varied in accordance with the size of the image formed on one of said sensors for adjustment with respect to an image size formed upon said photoconductive elements of the other of said sensors to compensate for differences which occur due to magnification and transmission differences among said two optical systems.

2. The automatic focusing apparatus of claim 1 wherein said optical means includes a lens in one of said systems and a plate in the other of said systems whereby the lens changes the focal length and the plate changes the transmission of light such that each said optical system has equal transmission of light and each of said optical systems transmits a like size image to its respective sensor.

3. The automatic focusing apparatus of claim 1 wherein field stops are interposed within said systems in order to define equal fields of view for said sensors.

4. The automatic focusing apparatus of claim 1 wherein a baffle is included between said sensors and parallel to the axis of said optical systems in order to limit stray light rays from one of said systems falling upon the said sensor of the other of said systems.

* * * * *